May 24, 1966

D. L. HILDEBRAND 3,252,597

SWEEP ARM TRANSMISSION FOR STORAGE STRUCTURES

Filed Nov. 29, 1963

INVENTOR.
DONALD L. HILDEBRAND
BY
Andrus & Starke
ATTORNEYS.

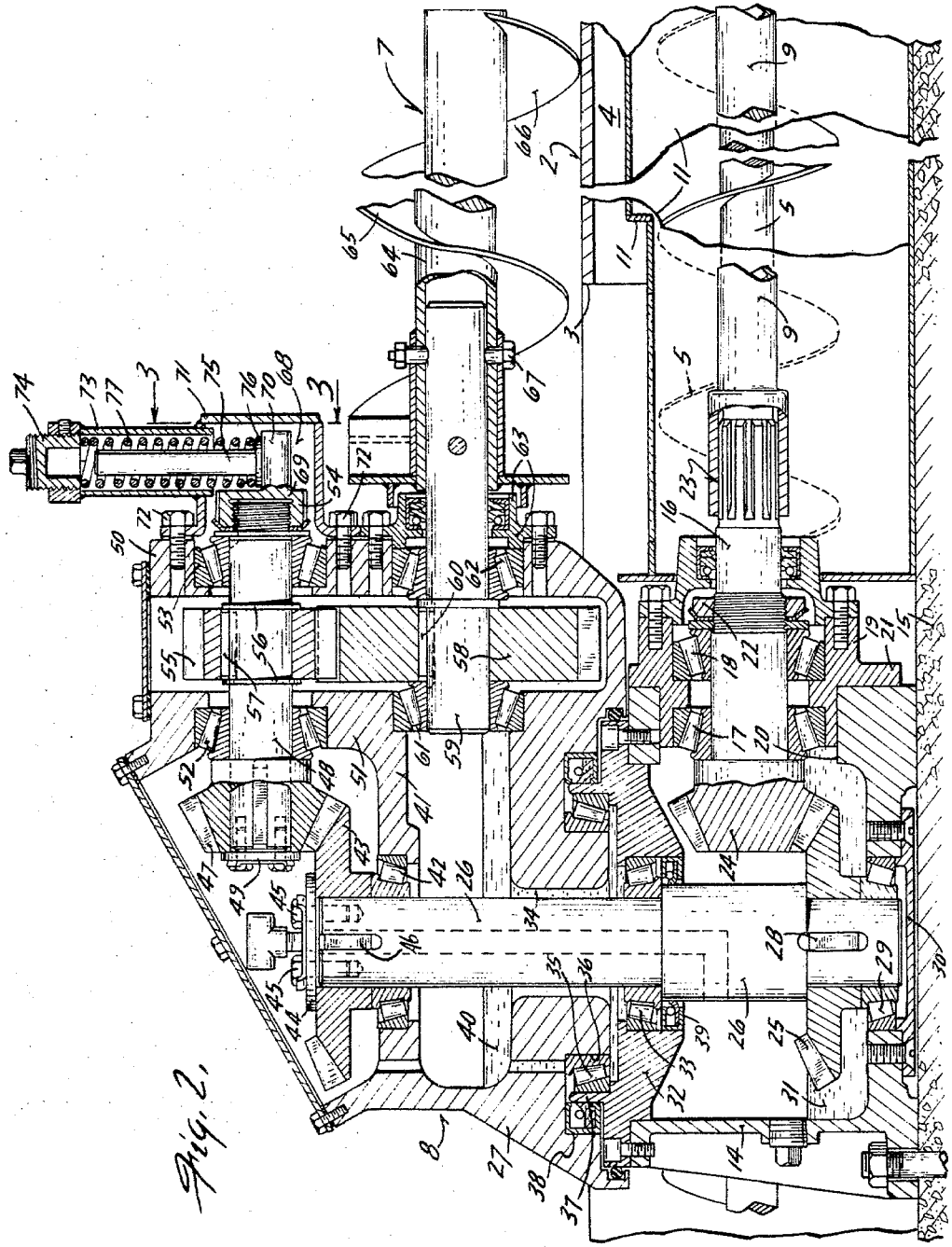

May 24, 1966 D. L. HILDEBRAND 3,252,597
SWEEP ARM TRANSMISSION FOR STORAGE STRUCTURES
Filed Nov. 29, 1963 3 Sheets-Sheet 3
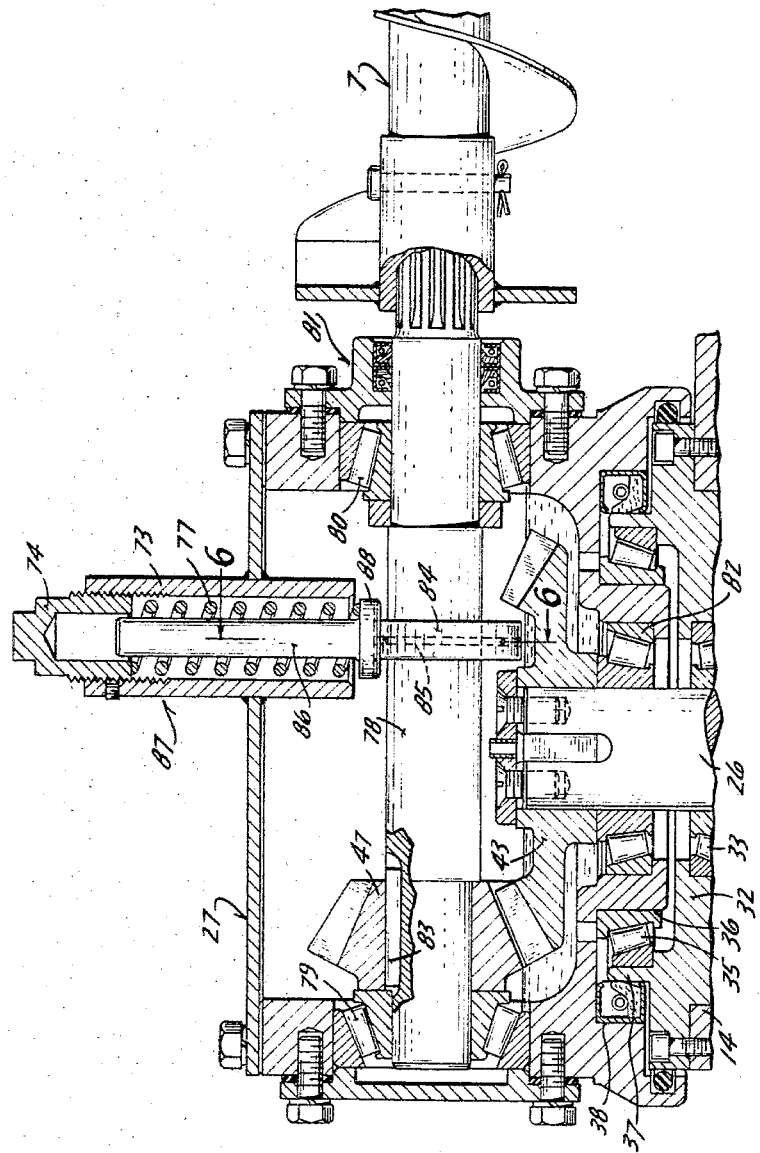
INVENTOR.
DONALD L. HILDEBRAND
BY
Andrus & Starke
ATTORNEYS.

United States Patent Office 3,252,597
Patented May 24, 1966

3,252,597
SWEEP ARM TRANSMISSION FOR STORAGE
STRUCTURES
Donald L. Hildebrand, Bloomingdale, Ill., assignor to
A. O. Smith Harvestore Products, Inc., Arlington
Heights, Ill., a corporation of Delaware
Filed Nov. 29, 1963, Ser. No. 326,665
18 Claims. (Cl. 214—17)

This invention relates to a sweep arm transmission for storage structures and particularly to a centrally mounted and driven sweep auger which is adapted to move material into the center of the structure and to be simultaneously angularly indexed within a structure to sweep the bottom thereof.

Silage and many other materials may be stored in flat bottom, cylindrical housings or silos of substantial height. In order to prevent contamination of the material by air or any other foreign elements, it is desirable to maintain the housings completely sealed including the discharge opening. A highly satisfactory means of maintaining the seal is shown in the prior art structures; for example, U.S. Patent 3,084,814 which discloses a pair of stacked discharge augers which are mounted centrally of the structure and extend radially therefrom. The lower or discharge auger is mounted in a discharge channel or trough whereas the upper or sweep auger is mounted immediately above the floor of the structure. The sweep auger transmits the material into a central opening and thereby to the discharge auger within the bottom trough. As disclosed therein, the sweep auger is made to sweep or traverse the bottom of the silo structure through an improved friction drive system which aids a normal tendency to creep of the sweep arm. The natural creep action of turret movement is insufficient for indexing because the turret rotates only when the stored material readily flows into the sweep auger as a result of the movement of material within the auger to the center of the housing or structure. Certain materials tend to bridge across the sweep auger creating an air tunnel. As a result, the tendency for the auger to move is substantially eliminated and it will not provide the necessary sweeping action about the silo structure. The previously referred to patent provides a transmission system which interconnects and supports the inner aligned ends of the discharge auger and the sweep auger. The discharge auger is driven and in turn, through the transmission, drives the sweep auger to move the material into the central opening. A very advantageous friction drive system is disclosed to continuously angularly index the sweep auger within the storage structure. In that drive system, a friction drive and bearing plate unit is mounted between suitable bearings and is interconnected to the transmission to be driven thereby. The upper housing which carries the sweep auger rests on the plate and is frictionally driven and in turn angularly indexes the sweep auger. This provides a slipping indexing action which is positive but is also related to the resistance acting in the horizontal plane.

Although the structure of the previous patent provides a completely satisfactory auger transmission system, the gear mechanism requires additional components and the friction plate construction separates the upper and lower housing. The present invention is directed to a relatively simple and rugged loading means employing a controlled loading of a gear shaft in the turret to control the natural creep forces and thereby provide for a selected rotation of the top turret.

U.S. Patent 2,934,224 which issued to H. B. Puckett on April 26, 1960 discloses a sweep auger having means to frictionally load a bevel gear shaft coupled to the sweep auger. The bevel gear shaft is rotatably carried by a rotatable housing or turret for indexing of the sweep auger. A slipping friction drag brake is applied to the shaft and opposes the rotation thereof. This induces a load in the bevel gear set which causes the support to rotate. Thus, if the bevel gear shaft were positively held against all rotation, the rotation of the input bevel gear would be reflected in a corresponding rotation of the driven bevel gear, its shaft and the rotatable support. By varying the braking force, the indexing can be controlled.

However, a friction device is inherently a heat generator; the braking forces being dissipated in the form of heat. Further, friction brakes have a limited life because of the unavoidable wear of the slipping surfaces and may require a relatively substantial amount of maintenance as well as objectionable down time.

The present invention provides an improved positive loading on the sweep auger drive mechanism without substantial friction forces and resulting heat generation for establishing a turning torque on the top turret irrespective of the loading of the material, as such, on the auger. The loading means is preferably adjustable such that the necessary turning moment can be decreased or increased. The tendency for the various materials to bridge over the sweep auger and create an air tunnel is relatively well known and the device of this invention can be designed or modified to accommodate many different materials.

In one preferred construction of the present invention, the sweep auger is connected by a suitable speed reducing gear train to a horizontal shaft of a bevel gear set or pair interconnected thereby with a vertical drive shaft forming a portion of the transmission from the driven discharge auger or a separate drive shaft for independent rotation of the sweep auger. An eccentric is secured to the outermost ends of the shaft and rotates simultaneously therewith. A spring loaded shaft resiliently engages the outer end of the eccentric and is caused to reciprocate with the eccentric causing compression and releasing of the spring. This then establishes a varying load on the upper gear shaft which is reflected as a turning moment in the interconnecting bevel gear set. This turning moment is taken up by the turret or housing and causes it to be rotated or indexed about the axis of the interconnecting vertical shaft. It has also been discovered that the varying load on the shaft caused by the compression and relaxation of the spring creates an advantageous slight pulsating movement of the auger.

In an alternate construction, the speed reduction gear train is eliminated and the sweep auger is connected directly to the top bevel gear shaft. An eccentric cam is secured to the shaft with a spring-loaded follower engaging the cam periphery. The follower reciprocates as a result of rotation of the shaft and attached eccentric, causing the spring to be compressed and relieved. This loads the shaft and induces a controlled turning moment on the turret. This latter system is somewhat smaller and uses less components, with a resulting cost reduction, in comparison to the prior system. However, the power transmitting capacity is also reduced. This invention provides a relatively simple and reliable means for controlling the indexing of the sweep auger independently of the material load on the sweep auger as well as providing for adjustment in accordance with the material being discharged.

The drawings furnished herewith illustrate the best mode presently contemplated for carrying out the invention.

In the drawings:

FIG. 2 is an enlarged vertical section taken on line 2—2 of FIG. 1;

FIG. 5 is a view similar to FIG. 2 illustrating an alternative embodiment of the invention and FIG. 6 is a fragmentary vertical section taken on line 6—6 of FIG. 5.

Figure 1:
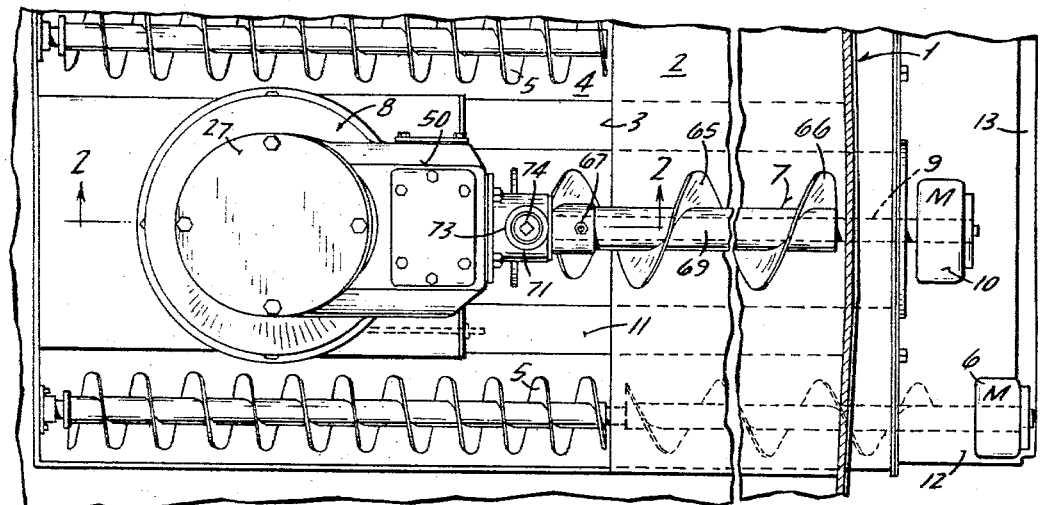
FIG. 1 is a top elevational view of a silo unloader structure and a fragmentary portion of the storage structure.

Referring to the drawings and particularly to FIGS. 1 and 2, a fragmentary view of a conventional silo or similar storage structure 1 is illustrated which is adapted to store material such as industrial products, silage or other suitable material, not shown. The structure 1 includes a floor area 2 having a central discharge opening 3 which is in communication with and forms a part of a discharge trough or channel 4 which extends radially outwardly beneath the floor. A pair of discharge augers 5 is rotatably mounted within the channel 4 and are adapted to be driven by an electric motor 6 disposed exteriorly of the structure 1 for selective removal of stored material through the channel 4 in any suitable or known manner. A sweep auger 7 is rotatably mounted at or near the center of the silo 1 and extends outwardly immediately adjacent the floor 2. Auger 7 is adapted to be rotated about its own axis to carry material to the central opening 3 and also to be angularly indexed over the floor of the silo 1. The indexing and rotation of the auger 7 continuously removes a portion of the stored material and carries it into the central discharge opening 3 and thus into the channel 4. A coupling or transmission 8 is mounted between the inner ends of augers 5 within the discharge opening 3 and connects the sweep auger 7 to a drive shaft 9 which extends outwardly through channel 4 and is coupled to an independent or separate drive motor 10 for driving the sweep auger as hereinafter set forth.

More particularly, each illustrated discharge auger 5 is generally of a conventional construction and includes a shaft carrying a spiral blade within a discharge passage formed by an inverted channel member 11 which is mounted within the channel or trough 4 and separates the latter into the separate discharge passages for guiding the material from the respective augers 5 outwardly to the exterior of the structure 1 in an known manner. The augers 5 and member 11 extend outwardly and terminate in a discharge or outer assembly 12 located exteriorly of the silo 1 with a depending outlet, not shown. If desired, the system can be made substantially air tight to eliminate air or other foreign elements into the storage structure; for example, if the system were applied to removal of silage or like material which is adversely affected by air.

The electric motor 6 is coupled to the outer ends of augers 5 through a suitable pulley and gear assembly, shown diagrammatically at 13, and may be of any suitable construction having sufficient power output to simultaneously drive the augers 5.

The motor 10 is also coupled to the shaft 9 for sweep auger 7 in any suitable manner for operation independently of the augers 5.

Figure 4:
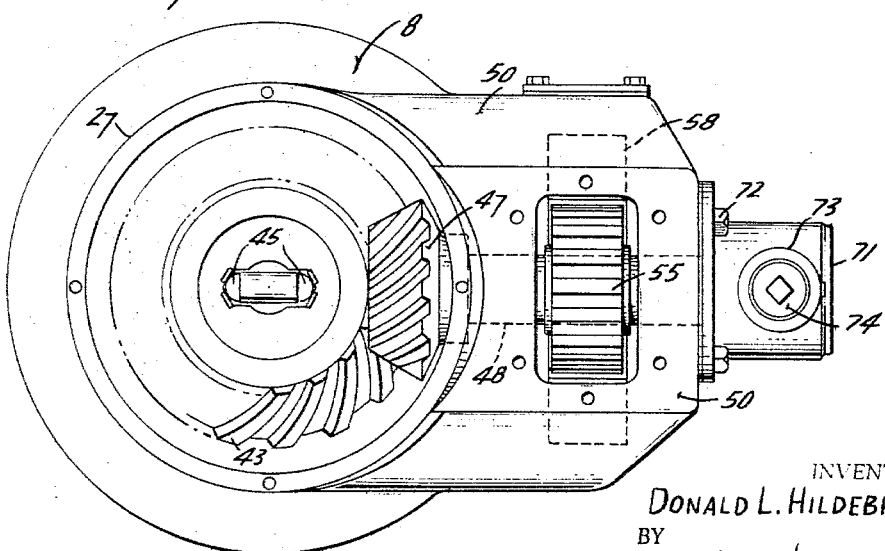
FIG. 4 is a partial top view of FIG. 2 with parts broken away and sectioned.

As more clearly shown in FIGS. 2 and 4, the transmission assembly 8 includes a lower cup-shaped housing 14 which rests on the floor 15 of the trough or channel 4. A gear coupling and support shaft 16 is rotatably secured projecting through the wall of the lower cup-shaped housing 14 by a pair of oppositely acting taper roller bearing units 17 and 18 to both mount the shaft for rotation about its own axis and to prevent axial movement of the shaft. The bearing units 17 and 18 are mounted in a suitable tubular bearing housing 19 which is press fitted or otherwise secured within a suitable opening 20 in the housing 14 with an annular flange 21 abutting the outer surface of housing 14. Shaft 16 projects through the bearings 17 and 18 and is clamped in position by a clamping nut 22 which is threaded onto a correspondingly threaded portion of shaft 16. A spline connection 23 interconnects the outer end of the coupling shaft 16 to the drive shaft 9 to transmit the operation of motor 10 into the transmission assembly 8.

As most clearly shown in FIG. 2, the transmission assembly includes a bevel gear 24 integrally formed on the inner end of coupling shaft 16 and located to mesh with a right angle bevel gear 25 for translating the horizontal rotation of gear 24 into a vertical rotation at gear 25. A vertical transmission shaft 26 is interconnected with the bevel gear 25 and projects upwardly into a mating top housing or turret 27 which is rotatably mounted upon the lower housing 14 as subsequently described.

Shaft 26 and gear 25 are interconnected for simultaneous rotation by a key 28 disposed within aligned grooves therein. The shaft is rotatably supported at its lower end and gear 25 is clamped to the end of shaft 26 by a taper roller bearing unit 29 disposed within a bottom wall opening in housing 14. A cover 30 overlies the wall opening and includes an inner annular ridge which projects into the opening with the bearing 29 resting thereon to clamp the bearing in place and to absorb the vertical thrust forces on the vertical shaft 26.

The bevel gears 24 and 25 are lubricated by maintaining a body of oil 31 within the housing 14 at a level generally corresponding to the upper surface of the vertical bevel gear 25.

The vertical shaft 26 projects upwardly into the turret 27 through a central bearing wall 32 which is bolted or otherwise secured to the upper flanged edge of the housing 14. A radial and vertical thrust taper bearing unit 33 is secured and fitted over the shaft 26 and arranged to act in the opposite direction from that of the lower taper bearing unit 29 to radially support the shaft 26 and to absorb upwardly directed axial thrust forces on shaft 26. The upper end of the vertical shaft terminates within the turret 27 and is coupled to rotate the sweep auger 7.

The turret 27 is generally a hollow cylindrical member having a shaft opening 34 aligned with the vertical shaft 26. A taper bearing unit 35 is secured within a recess 36 in the bottom wall of the turret 27 with the recess divided into two portions by an upstanding wall 37 on the upper edge of the central wall 32. Bearing unit 35 is disposed to the interior side of wall 37 to rotatably support the turret 27 upon the central wall 32.

An oil seal 38 is disposed between the outer circumference or surface of the upstanding wall 37 and the adjacent portion of the recess 36 to seal the housing junction. A similar oil seal 39 is disposed immediately below the bearing unit 33 and between the shaft 26 and the adjacent portion of the bottom housing or lower housing upper central bearing wall 32 to completely seal the lower end of the turret 27. Oil 40 is provided within the housing or turret 27 to provide for lubrication of the bearings and gears therein.

The uppermost end of the shaft 26 terminates immediately above an intermediate horizontal support wall 41 of turret 27 within which a taper roller bearing unit 42 is secured between the shaft 26 and a suitable recess formed in the upper surface of the wall 41. A bevel gear 43 having a vertical axis is clamped to the upper end of the shaft 26 and bears directly on the adjacent portion of the bearing unit 42, as follows. A clamping plate 44 is secured to the end of the shaft 26 by a plurality of bolts 45 or the like and overlies the adjacent end of bevel gear 43 with the gear clamped against a shoulder on shaft 26 to prevent axial movement of the bevel gear. A key 46 mates with grooves in the bevel gear 43 and the upper end of the shaft 26 to rotatably interlock the bevel gear to the shaft. Bevel gear 43 corresponds in configuration to the lower bevel gear 25 and meshes with a 90° bevel gear 47 to form an upper bevel gear set. The bevel gear 47 is clamped to the adjacent inner end of an idler shaft 48 having a horizontal axis of rotation by a clamping plate 49 which is bolted to the end of the shaft. The shaft 48 extends radially from gear 43 through a rectangular housing extension 50 to the one side of turret 27, as more clearly shown in FIG. 4. A vertical inner wall 51 adjacent the gear 47 has an opening through which shaft 48 projects with a taper roller bearing unit 52 within the opening to rotatably support the shaft and constituting a stop for the gear 47. A similar and oppositely disposed or acting bearing unit 53 in the outer wall of housing extension 50 rotatably supports the outer end of the idler shaft 48. The bearing unit 53 is disposed within a suitable opening or recess in the outer wall of the turret 27 and is secured to the shaft by a clamping ring nut 54 which threads on or is otherwise secured to the correspondingly threaded end of the idler shaft 48. A first speed reducing gear 55 is secured between the intermediate vertical wall 51 and the outer wall 50 by suitable snap rings 56 engaging the opposite faces of the gear and mating with suitable correspondingly positioned grooves in the shaft 48. The gear 55 is also keyed to the shaft as at 57 to provide for simultaneous rotation of the shaft and the gear. A reduction gear 58 mates with the gear 55 and is keyed to a sweep auger coupling shaft 59 as by a key 60. The shaft 59 is rotatably supported at the inner end by a taper roller bearing unit 61 within an opening in vertical wall 51 and at the outer end by a bearing unit 62 secured in the outer wall of the housing extension 50. A seal and cover 63 overlies the outer bearing unit 62 and is secured to housing extension 50 with an inner hub portion serving as a stop for bearing unit 62.

The sweep auger 7 generally includes a tubular shaft 64 having a spiral blade 65 secured extending substantially the complete length of the auger shaft 64 such that rotation of the auger about its own axis results in the axial movement of the material from the outer edge of the structure to the central opening 3 and into the discharge auger 5. The outer end of the auger 7 is supported by the last or last couple of flights 66 of blade 65 which rest on the floor 2 of structure 1. The innermost end of the shaft 64 is connected to the outer end of the coupling shaft 59 by a suitable bolt and nut assembly 67 or the like.

The sweep auger 7 is angularly indexed within the storage structure 1 in order to provide for the even discharge of the material within the structure 1 by a sweep control unit 68, as follows.

Figure 3:
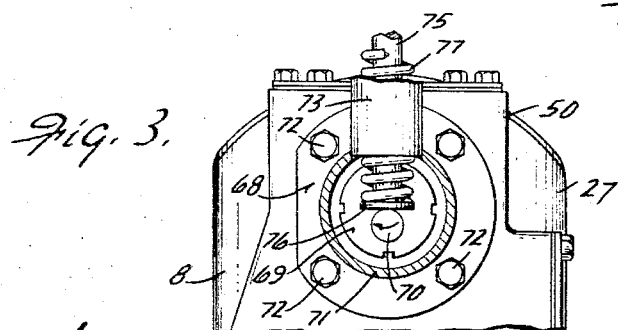
FIG. 3 is a fragmentary end view taken on line 3—3 of FIG. 2.

Referring particularly to FIGS. 2 and 3, the sweep control unit 68 includes the bearing lock nut 54 which is cup-shaped to provide an outer base 69. A shaft 70 protrudes from the base 69 with the axis of shaft 70 offset from that of the shaft 48 to form an eccentric. An outer cup-shaped housing 71 is secured by bolts 72 to the outer wall of the housing or turret extension 50 and covers the outer end of shaft 48 and the eccentric. A tubular guide 73 is welded or otherwise secured within an opening in the side wall of the housing 71 and projects upwardly at 90° from the axis of the eccentric shaft 70. The guide 73 can be located in any other plane with respect to the shaft 70 as long as it does not interfere with the action of the sweep auger 7. A closure plug 74 is threaded into outer end of the housing 73 to adjustably seal the opening therein. A plunger or push rod 75 is disposed within the housing 73 and includes an inner enlarged bearing head 76 which rides on the aligned portion of the eccentric shaft 70. A coil spring 77 encircles the rod 75 between the head 76 and the inner end surface of the plug 74 to resiliently urge and hold the enlarged bearing head 76 in sliding engagement with the eccentric shaft 75. As a result, as the top idler shaft 48 rotates, the eccentric shaft 70 rotates about the axis of shaft 48. This causes the push rod 75 to move or reciprocate in the vertical direction once each revolution of the shaft with a corresponding compression and relaxation of the spring 77. The latter creates a varying load on the eccentric shaft 70 and the idler shaft 48. This in turn will be reflected in a loading of the top bevel gear set formed by gears 43 and 47 and the induced load is reflected by a turning moment in the upper bevel gear. This turning movement in turn is transmitted to the turret 27 through the supporting bearing units 52 and 53 and causes it to rotate or index about the axis of the vertical center shaft 26. The turning moment on turret 27 is substantially independent of the loading of the sweep auger 7.

The operation of the illustrated embodiment of the invention can be briefly summarized as follows.

The electric motor 10 is energized to rotate the transmission drive shaft 9. The motor 6 may or may not drive the discharge augers 5 for moving material radially outwardly through the bottom channel 4. As a result of operation of motor 10, the lower bevel gear set is driven to rotate the vertical shaft 26 which in turn drives the upper bevel gear set formed by gears 43 and 47. The rotation is transmitted by the idler shaft 48 and the speed reducing gear train to the shaft 59 and the interconnected sweep auger shaft 64. The rotation of the sweep auger 7 about its own axis continues to draw material radially of the storage structure 1 into the central discharge opening 3 and the discharge auger 5 for outward transmission through the trough 4.

Simultaneously, with the rotation of the idler shaft 48, the eccentric shaft 70 rotates to cause compressing and releasing of the coil spring 77. This action as previously noted results in a loading of the shaft 48 which in turn induces the shaft a load which is reflected in the upper bevel gear set as a turning reaction between the two bevel gears 43 and 47. This turning moment is applied to turret 27 through the shaft 48 and the bearings units 52 and 53. The upper turret 27 which is rotatably supported by the bearing unit 35 is free to rotate as a result of this turning moment. Consequently, turrent 27 is rotated about a vertical axis of the center shaft 26 to continuously index the sweep auger 7 about the floor 2.

The closure plug 74 is adjusted with respect to the tubular guide 73 to adjust the precompression of the loading spring 77 and thereby adjusts the induced load on the shaft 48. This in turn adjusts the magnitude of the turning moment applied to the turret 27. As a result, the turning moment can be set at a desired level within a selected range depending upon the exact configuration of the unit to accommodate many different materials. A single eccentric assembly can, for example, be provided for many different storage structures and thereby reduce and minimize manufacturing and inventory costs.

Additionally, the outermost flight or flight 65 which rests on the floor 2 creates a reaction force tending to index the auger 7. By proper rotational selection, such as shown in FIG. 2, this indexing action assists that of the unit 68. Thus, referring to FIGS. 2 and 4, counterclockwise rotation of the gear 43, as viewed in FIG. 4, creates a counterclockwise rotation of gear 47 and shaft 48, as viewed from the right in FIG. 2. The reduction gears 55 and 58 reverse the rotation of auger shaft 64 to a clockwise rotation, as viewed from the right in FIG. 2. This has been found to provide the proper interaction between flight 65 and the floor 2 to assist the desired indexing of auger 7.

Referring particularly to FIGS. 5 and 6, an alternative shaft loading means within the scope of the present invention is shown; corresponding elements in the embodiments being similarly numbered for simplicity and clarity of explanation.

FIGS. 5 and 6 show a fragmentary portion of a transmission unit for interconnecting an auger 7 generally similar to the construction of the first embodiment. The top current 27 is rotatably mounted on a lower housing 14. In this embodiment, however, the top turret 27 is generally a cylindrical member of substantially reduced vertical length with an output shaft 78 rotatably supported therein by taper roller bearing units 79 and 80 which are secured in diametrically opposite wall openings in the turret 27. The output shaft 78 extends outwardly through a sealed opening 81 adjacent the taper roller bearing unit and is direct coupled to the sweep auger 7.

Shaft 78 is coupled to the vertical transmission shaft 26 through a bevel gear 43 secured to shaft 26 and a bevel gear 47 secured to the shaft 78.

The shaft 26 is rotatably supported by a taper roller bearing unit 82 disposed in a bottom wall portion of the turret 27 as shown in FIG. 5 to support the upper end of the shaft generally in accordance with the support of the shaft 26 provided by a taper roller bearing unit 42 in the intermediate horizontal wall 41 of the first embodiment. This latter structure is not required in FIGS. 5 and 6 because of the direct coupling of shaft 78 to auger 7.

The bevel gear 47 is shown as a separate member keyed to the shaft 78 as at 83 and clamped between the bearing unit 79 and a shoulder on the shaft 78. The bevel gear 47 is disposed adjacent the inner portion of the turret in spaced relation to the coupling to the auger 7 to provide an unobstructed shaft portion therebetween and to create proper rotation of auger 7 for assisting the indexing of turret 27. Thus, elimination of the reduction gearing would reverse the direction of auger 7 if bevel gear 47 were maintained to the right side of the bevel gear 43, as viewed in FIG. 5. The transposition of gear 47 reverses the direction of rotation of gear 47 and therefore maintains the same directional rotation of auger 7.

In accordance with the invention as shown in FIGS. 5 and 6, an eccentric cam 84 is secured to the shaft 78 by a suitable lock pin 85 or the like. The eccentric cam is shown located to the opposite side of shaft 26 from the bevel gear 47. A push rod 86 generally corresponding to push rod 75 is slidably supported within a spring loading assembly 87 generally in the manner push rod 75 is loaded. The enlarged head 88 of the push rod 86 is provided with a concave face generally corresponding to the curvature of the periphery or cam surface of the cam 84, as most clearly shown in FIG. 6.

The cam 84 rotates with the shaft 78 causing the push rod 86 to reciprocate in a vertical direction as in the drawings. This results in alternate compression and relaxation of the precompressed loading spring, generally in a manner similar to that in the first embodiment. The load on the shaft produces an artificial load on the transmission shaft 78 and increases the rotational load at the bevel gear set. This artificial load on the shaft 78 is reflected in a turning moment in the turret 27. The operation of the invention shown in FIGS. 5 and 6 therefore corresponds to that previously described, with a pulsating turning movement or indexing of the sweep auger 7. The structure of FIGS. 5 and 6, which compared to that of the previous embodiment, shows a substantial reduction in machinery and size as a result of elimination of the speed reducing gear train and the separate idler or transmission shaft. However, elimination of the speed reduction system does reduce the power transmission capacity of the system. The particular design employed will be determined by the power and cost requirements established for any particular system and will generally be a compromise between the various factors.

The present invention thus provides a very reliable and generally inexpensive means for providing controlled loading of a sweep auger or the like without generation of undue heat or the like.

The present invention provides a very simple and inexpensive means for loading of a sweep arm to insure continuous indexing of the arm within a suitable storage structure.

Various modes of carrying out the invention are contemplated as being within the scope of the following claims particularly pointing out and distinctly claiming the subject matter which is regarded as the invention.

I claim:

1. A transmission for actuating an output member in accordance with movement of an input member, comprising drive means including a pair of mating bevel members one of which is driven by the input member and the second of which drives the output member, shaft means connected to the second of said bevel members, and loading means bearing on the shaft means substantially in a radial direction to create a radial load on the shaft means in spaced relation to the bevel members, said loading means including means to vary the loading means in an intermittent and cyclical manner in response to rotation of the shaft means.

2. The transmission of claim 1 wherein said loading means includes, an eccentric shaft member secured to said shaft means, and a resilient loading means acting on said eccentric shaft member.

3. An unloader transmission for actuating a sweep conveyor means and a discharge conveyor means within a structure for removing material from the structure, comprising a centrally divided transmission enclosure defining an upper rotatable turret rotatably mounted on a lower support, a drive transmission system within the enclosure including engaging bevel drive members disposed in the turret, said turret having wall means supporting a bevel drive member output shaft, drive means coupled to the drive transmission system within the lower support and extending outwardly of the structure, means for coupling of the sweep conveyor to the drive transmission system within the turret, and a control rod member resiliently urged into radial loading engagement with the bevel drive member output shaft and thereby adjusting the reaction and turning force on the turret.

4. The unloader transmission of claim 3, wherein said bevel drive members interconnect a drive shaft to the output shaft, and a loading shaft is eccentrically secured to the end of the drive shaft and resilient means urge the rod member into engagement with the loading shaft establishing a transverse force on said loading shaft.

5. The unloader transmission of claim 3, wherein said bevel drive members interconnect a drive shaft to the output shaft, and an eccentric member is secured to the output shaft in alignment with the rod member, rotation of said shaft causing reciprocation of the rod member with a cyclical compression and relaxation of the resilient means.

6. An unloader for removing material from a structure having a generally horizontal wall with an opening connecting the structure to a discharge passage and having an inner conveyor for transporting material to the opening, which comprises a centrally divided transmission enclosure defining a lower housing for mounting centrally of the structure and an upper housing rotatably supported on the lower housing, a transmission within the enclosure having an output operatively connected to the adjacent end of the inner conveyor, said transmission including a vertical drive shaft coupled by a bevel gear set to a horizontal shaft journaled in the upper housing, a gear train coupling said top horizontal shaft to the inner conveyor, and a shaft loading means secured to the upper housing and resiliently and radially engaging the horizontal shaft essentially solely on a radial line to radially vary the loading on the shaft and thereby the turret turning moment applied to the upper housing by the reaction between the bevel gears of said gear set.

7. The unloader of claim 6 having said shaft loading means including,
- a loading shaft eccentrically protruding from the outer end of the horizontal shaft,
- a push rod slidably disposed at right angles to the loading shaft and with one end engaging the side of the loading shaft, and
- resilient means urging said push rod into engagement with the loading shaft to control the reaction within the bevel gear set and thereby the turning moment applied to the upper housing.

8. The unloader of claim 7 having said shaft loading means including,
- a tubular guide for said push rod concentrically mounted and projecting outwardly thereof, and
- a coil spring encircling said push rod and acting between said preset means and said push rod and providing a preloading of the horizontal shaft to provide a controllable reaction within the bevel gear set and thereby the turning moment applied to the upper housing.

9. An unloader constructed in accordance with claim 3 wherein the auger includes a spiral flight on the outer end resting on the horizontal wall and creating a turning moment corresponding to that of the bevel gears.

10. An unloader for removing material from a structure having a generally horizontal wall with an opening connecting the structure to a discharge passage and having a sweep conveyor means for transporting material to the opening, which comprises,
- a transmission enclosure disposed within the opening and including an upper turret rotatably supporting the sweep conveyor means,
- a transmission gear assembly disposed within the enclosure and including a vertical shaft and having a bevel gear secured to the upper end of the vertical shaft,
- drive means coupled to the lower end of the vertical shaft,
- an indexing shaft rotatably supported in spaced vertical walls of the turret and having a bevel gear on the inner end meshing with the bevel gear on the top of the vertical shaft,
- means coupling said indexing shaft to the sweep conveyor means,
- an eccentric member secured to the indexing shaft,
- a tubular spring housing secured to the turret and projecting radially of the eccentric member and having an adjustable outer closure member,
- a push rod disposed in the spring housing with an enlarged head adjacent the eccentric member, and
- a coil spring encircling the rod and precompressed between the enlarged head and the closure member to resiliently urge said rod into engagement with the eccentric member, said spring being compressed by rotation of the eccentric member with the indexing shaft and inducing a load on the indexing shaft which is reflected as a turning moment in the bevel gear set causing the top turret to rotate about a vertical axis, said moment being proportional to the precompression of said spring.

11. An unloader for removing material from a structure having a generally horizontal wall with an opening connecting the structure to a discharge passage and having a sweep conveyor means for transporting material to the opening, which comprises,
- a centrally divided transmission enclosure disposed within the opening and defining an upper turret rotatably supporting the sweep conveyor means and a lower housing,
- bearing means rotatably supporting the turret for rotation about a vertical axis,
- a transmission gear assembly disposed within the enclosure and including a rotatably supported vertical shaft with a bevel gear secured to the upper end of the vertical shaft,
- drive means coupled to the lower end of the vertical shaft and extending outwardly through the discharge passage,
- an idler shaft rotatably supported in spaced vertical walls of the turret and having a bevel gear on the inner end meshing with the bevel gear of the vertical shaft,
- gear means coupling said idler shaft and said sweep conveyor means,
- an eccentric having a hub portion secured to the outermost end of the idler shaft and an eccentric shaft projecting axially outwardly and offset from the axis of the idler shaft,
- an eccentric housing secured to the turret and enclosing the eccentric and having a spring housing projecting laterally therefrom,
- a preset member adjustably secured to the outer end of the spring housing,
- a push rod disposed in the spring housing and having an enlarged head within the eccentric housing, and
- a coil spring encircling the rod and precompressed between the enlarged head and the present member to resiliently urge said rod into engagement with eccentric shaft, said spring being compressed by rotation of the eccentric and inducing a load on the idler shaft which is reflected as a turning moment in the bevel gear set causing the top turret to rotate about a vertical axis, said moment being proportional to the precompression of said spring by said preset member.

12. In an unloader for removing material from a structure having a generally horizontal wall with an opening connecting the structure to a discharge passage and having an inner sweep auger conveyor for transporting material to the opening, the improvement which comprises,
- a centrally divided transmission enclosure disposed within the opening and defining an upper turret rotatably supporting the sweep auger conveyor and a lower housing,
- a wall means centrally of the enclosure and secured to the lower housing,
- bearing means in the wall means rotatably supporting the turret for rotation about a vertical axis,
- a transmission gear assembly disposed within the enclosure and including a vertical shaft rotatably supported in the wall means and having bevel gears secured one to each end of the vertical shaft,
- drive means coupled to the bevel gear on the lower end of the vertical shaft and extending outwardly through said discharge passage,
- an idler shaft rotatably supported in spaced vertical walls of the turret and having a bevel gear on the inner end meshing with the bevel gear on the top of the vertical shaft,
- a coupling shaft journaled in said spaced vertical walls below said idler shaft for connection to the sweep auger conveyor,
- meshing gear means secured to said idler shaft and said coupling shaft between said spaced walls,
- an eccentric having a hub secured to the outermost end of the idler shaft and an eccentric shaft offset from the axis of the idler shaft and extending outwardly parallel to the idler shaft,
- a cup-shaped housing secured to the turret and enclosing the eccentric and having a tubular spring housing projecting at right angles from the eccentric shaft,
- a plug adjustably secured within the outer end of the spring housing,
- a push rod disposed in the spring housing and having an enlarged head within the cup-shaped housing, and a coil spring encircling the rod and precompressed between the enlarged head and the plug to resiliently urge said rod into engagement with the eccentric shaft, said spring being compressed by rotation of the eccentric and inducing a load on the idler shaft which is reflected as a turning moment in the bevel gear set causing the top turret to rotate about a vertical axis, said moment being proportional to the precompression of said spring.

13. In a drive system,
a transmission having a bevel gear set coupling a pair of perpendicularly related shafts, one of said shafts constituting an output shaft,
support means to rotatably support said output shaft for indexing movement about the axis of the second shaft,
an eccentric cam secured to the output shaft for rotation therewith,
a loading member carried by the support means for engagement with the periphery of the cam, and
resilient means urging said loading member into said engagement.

14. In a drive system,
a transmission having a bevel gear set coupling a pair of perpendicularly related shafts, one of said shafts constituting an output shaft,
a turret member rotatably mounted for rotation about the axis of the input shaft,
spaced bearing means in the turret member rotatably supporting the output shaft with the load coupling end thereof projecting from the turret member,
an eccentric cam secured to the output shaft between said bearing means,
a push rod disposed within the turret with one end in engagement with the periphery of the cam, and
a resilient loading means holding the push rod end in engagement with the cam and including means to adjust the holding force thereof.

15. An unloader for removing material from a structure having a horizontal wall with an opening connecting the structure to a discharge passage and having an inner sweep auger conveyor for transporting material to the opening, the improvement which comprises,
a transmission housing having an upper turret rotatable about a vertical axis,
an indexing shaft rotatably supported by the turret and direct coupled to the sweep auger conveyor,
a vertical drive shaft rotatably mounted in the transmission housing,
a bevel gear set coupling said drive shaft to said indexing shaft,
an eccentric cam carried by said indexing shaft, and
a resiliently loaded member engaging the cam member to create a cyclical loading of the indexing shaft in a plane normal to the axis of the indexing shaft and creating a turning moment on the turret.

16. In the unloader of claim 15, wherein the resiliently loaded member includes,
a guide housing having an outer adjustable stop member,
a rod member having one end bearing on the periphery of the cam member and the opposite end extending into a guide housing and having a stop portion, and
a resilient member encircling the rod member and acting between the stop member and the stop portion of the rod member.

17. The unloader constructed in accordance with claim 15 wherein the sweep auger includes a shaft having one end coupled to the indexing shaft and being cantilevered therefrom and having a multiflight spiral blade secured thereto, the outermost flight resting on the horizontal wall to support the auger and creating a reaction turning moment in response to rotation of the flight about the axis of the auger shaft in the same direction as the loaded member.

18. In a transmission system for driving and indexing an auger comprising,
a base,
an auger having a multiflight spiral blade secured to a shaft and extending over the base with an input coupling at one end with the auger cantilevered therefrom, an outer one of said flights bearing upon the base and creating a turning moment on the shaft about the input coupling,
drive means including a pair of mating bevel members carried by shaft means one of which is driven and the other of which is connected to the coupling,
a support for said shaft means rotatably mounted for rotation about an axis normal to the shaft means which is driven, and
a rod resiliently engaging the side of the shaft means connected to the coupling and creating a turning moment on the shaft means and support in the same direction as the turning moment created by said flight.

References Cited by the Examiner
UNITED STATES PATENTS

| 1,804,055 | 5/1931 | Herrmann | 74—773 |
| 2,934,224 | 4/1960 | Puckett | 214—17 |
| 3,064,831 | 11/1962 | Cook | 214—17 |
| 3,084,814 | 4/1963 | Schaefer | 214—17 |

GERALD M. FORLENZA, *Primary Examiner.*

HUGO O. SCHULZ, *Examiner.*

R. G. SHERIDAN, *Assistant Examiner.*